US012130638B2

(12) United States Patent
Lekutai

(10) Patent No.: US 12,130,638 B2
(45) Date of Patent: Oct. 29, 2024

(54) UNMANNED AERIAL VEHICLE GROUPING

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 343 days.

(21) Appl. No.: 17/003,875

(22) Filed: Aug. 26, 2020

(65) Prior Publication Data
US 2022/0066475 A1    Mar. 3, 2022

(51) Int. Cl.
G05D 1/00  (2024.01)
H04B 17/318  (2015.01)
H04W 4/44  (2018.01)
H04W 72/21  (2023.01)

(52) U.S. Cl.
CPC .......... *G05D 1/104* (2013.01); *H04B 17/318* (2015.01); *H04W 4/44* (2018.02); *H04W 72/21* (2023.01)

(58) Field of Classification Search
CPC .... G05D 1/104; H04W 72/0413; H04W 4/44; H04B 17/318
See application file for complete search history.

(56) References Cited

U.S. PATENT DOCUMENTS

| | | | |
|---|---|---|---|
| 8,750,934 B2 | 6/2014 | Lucidarme | |
| 2014/0219124 A1 | 8/2014 | Chang et al. | |
| 2016/0363929 A1* | 12/2016 | Clark | B64C 39/024 |
| 2018/0184269 A1 | 6/2018 | Christoval et al. | |
| 2018/0234186 A1 | 8/2018 | Morser et al. | |
| 2019/0044609 A1* | 2/2019 | Winkle | B64C 39/024 |
| 2019/0086938 A1 | 3/2019 | Shattil | |
| 2020/0136695 A1 | 4/2020 | Hu et al. | |

FOREIGN PATENT DOCUMENTS

| | | | | |
|---|---|---|---|---|
| EP | 1008254 | * | 6/2008 | ............ H04L 45/00 |
| KR | 20180056326 | * | 5/2018 | ............ H04W 84/06 |

OTHER PUBLICATIONS

Bezvitniy, S.A., "Control Systems for Unmanned Aerial Vehicles, 2019 Wave Electronics and its Application in Information and Telecommunication Systems (WECONF)" Jun. 2019.*

* cited by examiner

*Primary Examiner* — Joan T Goodbody

(57) ABSTRACT

Methods, systems, and apparatus, including computer programs encoded on a computer storage medium, for grouping unmanned aerial vehicles are disclosed. In one aspect, a method includes the actions of receiving, by a first unmanned aerial vehicle that includes a first transceiver, a communication from a base station. The actions further include receiving, by the first unmanned aerial vehicle and from a second unmanned aerial vehicle that includes a second transceiver, data indicating that the second unmanned aerial vehicle received the communication from the base station. The actions further include determining first signal parameters of the communication. The actions further include receiving, from the second unmanned aerial vehicle, second signal parameters of the communication. The actions further include selecting the first unmanned aerial vehicle or the second unmanned aerial vehicle to transmit a reply communication to the base station.

16 Claims, 5 Drawing Sheets

400

```
┌─────────────────────────────────────────────────────────────┐
│ Receive, by a first unmanned aerial vehicle that includes a │
│ first transceiver, a communication from a base station      │
│                                                         410 │
└─────────────────────────────────────────────────────────────┘
                              │
                              ▼
┌─────────────────────────────────────────────────────────────┐
│ Receive, by the first unmanned aerial vehicle and from a    │
│ second unmanned aerial vehicle that includes a second       │
│ transceiver, data indicating that the second unmanned       │
│ aerial vehicle received the communication from the base     │
│ station                                                 420 │
└─────────────────────────────────────────────────────────────┘
                              │
                              ▼
┌─────────────────────────────────────────────────────────────┐
│ Determine, by the first unmanned aerial vehicle, first      │
│ signal parameters of the communication                      │
│                                                         430 │
└─────────────────────────────────────────────────────────────┘
                              │
                              ▼
┌─────────────────────────────────────────────────────────────┐
│ Receive, by the first unmanned aerial vehicle and from the  │
│ second unmanned aerial vehicle, second signal parameters    │
│ of the communication                                        │
│                                                         440 │
└─────────────────────────────────────────────────────────────┘
                              │
                              ▼
┌─────────────────────────────────────────────────────────────┐
│ Based on the first signal parameters and the second signal  │
│ parameters, select, by the first unmanned aerial vehicle,   │
│ the first unmanned aerial vehicle or the second unmanned    │
│ aerial vehicle to transmit a reply communication to the     │
│ base station                                            450 │
└─────────────────────────────────────────────────────────────┘
```

```
┌─────────────────────────────────────────────────────────┐
│ Receive, by a secondary unmanned aerial vehicle that    │
│ includes a second communications interface, a           │
│ communication from a base station                       │
│                                                     510 │
└─────────────────────────────────────────────────────────┘
                            │
                            ▼
┌─────────────────────────────────────────────────────────┐
│ Determine, by the secondary unmanned aerial vehicle,    │
│ that a primary unmanned aerial vehicle received the     │
│ communication from the base station                     │
│                                                     520 │
└─────────────────────────────────────────────────────────┘
                            │
                            ▼
┌─────────────────────────────────────────────────────────┐
│ Based on determining that the primary unmanned aerial   │
│ vehicle received the communication from the base        │
│ station, determine, by the secondary unmanned aerial    │
│ vehicle, second signal parameters of the communication  │
│                                                     530 │
└─────────────────────────────────────────────────────────┘
                            │
                            ▼
┌─────────────────────────────────────────────────────────┐
│ Provide, by the secondary unmanned aerial vehicle and   │
│ to the first unmanned aerial vehicle, the second signal │
│ parameters                                              │
│                                                     540 │
└─────────────────────────────────────────────────────────┘
                            │
                            ▼
┌─────────────────────────────────────────────────────────┐
│ In response to providing the second signal parameters,  │
│ receive, by the secondary unmanned aerial vehicle and   │
│ from the first unmanned aerial vehicle, an instruction  │
│ regarding responding to the communication               │
│                                                     550 │
└─────────────────────────────────────────────────────────┘
```

FIG. 5

UNMANNED AERIAL VEHICLE GROUPING

BACKGROUND

An unmanned aerial vehicle (UAV) is an aircraft without a human pilot on board. A UAV can be controlled remotely or using an on-board navigation system. Some UAVs may include a cellular radio that is capable of communicating with a cellular network. The UAV may receive navigation instructions through the cellular radio and output data collected from various sensors included in the UAV.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIGS. 4 and 5 are flowcharts of example processes for communicating with a base station using a group of UAVs.

DETAILED DESCRIPTION

UAVs are becoming increasingly popular and include more and more features. One of these features can include a cellular transceiver that allows the UAV to communicate with a cellular network. While a mobile phone typically stays near the ground when it is communicating with the cellular network, a UAV may operate above the base stations while its cellular transceiver is communicating with the same cellular network. With the UAV frequently changing altitude, speed, and orientation, the UAV may have difficultly maintaining a connection with a nearby base station. Even if the UAV is able to maintain a connection with a nearby base station, the connection may not be robust enough to meet the requirements of the UAV.

To improve the ability of the UAV to maintain a robust connection with a nearby base station, the UAV may be paired with another UAV in a primary/secondary relationship. The two UAVs may be connected by a cable or communicate wirelessly. Both may include a cellular transceiver. When the base station transmits a signal to the UAVs, each of the UAVs receives the signal. Both of the UAVs calculate various signal parameters of the signal, and the secondary UAV transmits the signal parameters to the primary UAV. The primary UAV uses the signal parameters to determine which UAV should transmit a response to the base station. The primary UAV may select the UAV with the most reliable or strongest connection with the base station.

In some instances, the primary UAV may adjust its altitude, speed, location, or other flight parameters in an attempt to improve the connection with the nearby base station. The primary UAV may also instruct the secondary UAV to adjust its altitude, speed, location or other flight parameters to improve the connection. In some instances, the primary UAV may instruct the secondary UAV to become the primary UAV in the event of damage to or low battery power of the primary UAV.

Figure 1:
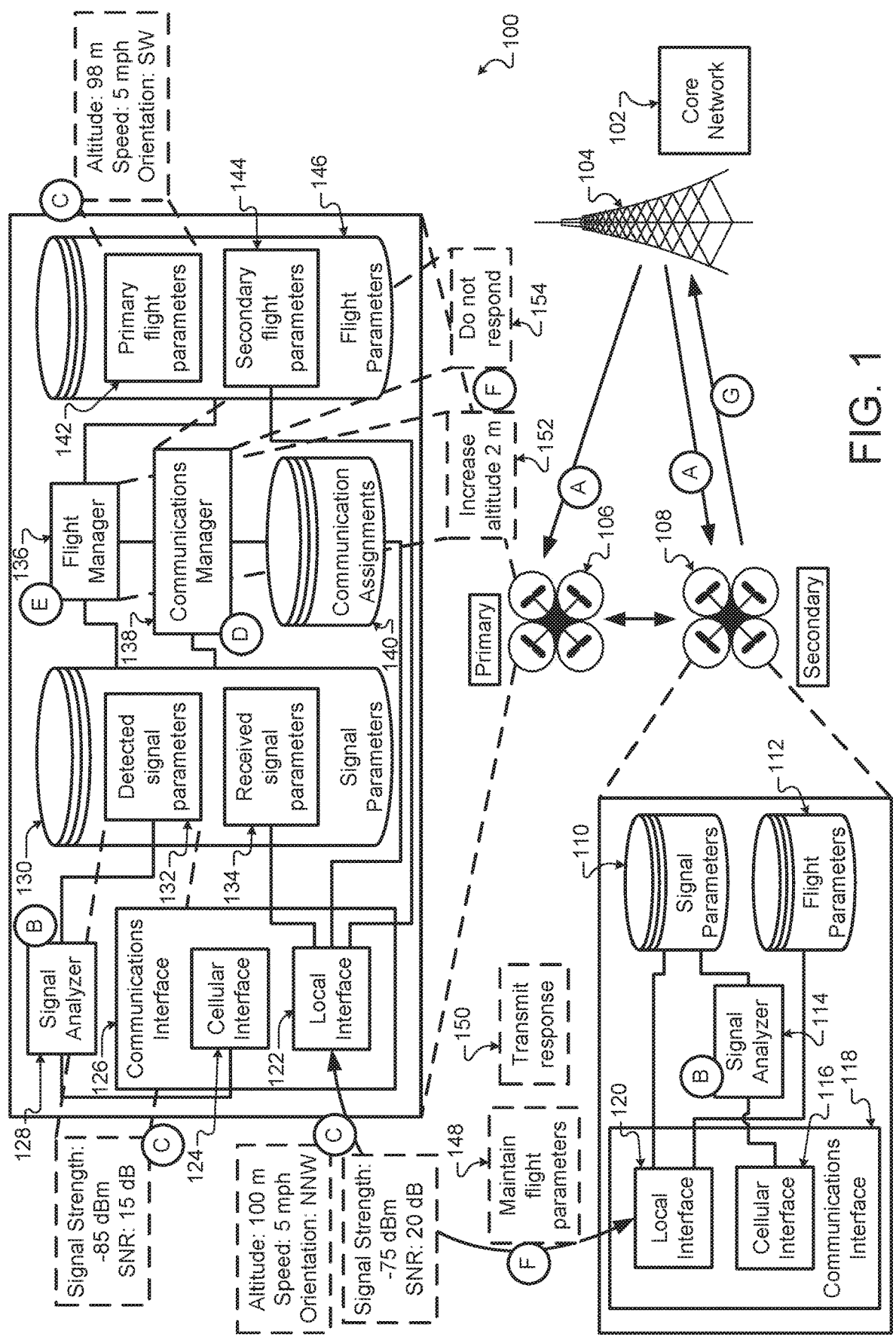
FIG. 1 illustrates an example system for communicating with a base station using a group of UAVs.

FIG. 1 illustrates an example system 100 for communicating with a base station using a group of UAVs. Briefly, and as described in more detail below, the primary UAV 106 and the secondary UAV 108 are navigating in the air. They receive a communication from a base station 104 of a wireless carrier network. Each of the primary UAV 106 and the secondary UAV 108 include a signal analyzer that calculates signal parameters of the communication. Based on the calculated signal parameters, the primary UAV 106 determines whether the primary UAV 106 or the secondary UAV 108 should respond to the communication. This determination may be based, in part, on comparing the strength of the signals received by each UAV. In some instances, the primary UAV 106 may select the UAV that detected a stronger signal from the base station 104.

In more detail and in stage A, the primary UAV 106 and the secondary UAV 108 are navigating through the air. The primary UAV 106 and the secondary UAV 108 may be navigating based on a predetermined flight pattern, through remote control, or through a similar mechanism. In some instances, the primary UAV 106 and the secondary UAV 108 may be stationary, either in the air or in contact with an object. In some instances, the primary UAV 106 and the secondary UAV 108 may appear to be moving randomly while surveying a predetermined area. The primary UAV 106 and the secondary UAV 108 may be following the same flight pattern and/or responding to the same remote control commands. The remote control commands may be received from a device communicating with the primary UAV 106 and/or the secondary UAV 108 from the base station 104 through the wireless carrier network, an infrared communication channel, or any other similar communication channel.

The primary UAV 106 and the secondary UAV 108 may each include a separate communications interface 126 and 118. The communications interface 126 of the primary UAV 106 may include a cellular interface 124 and a local interface 122. Similarly, the communications interface 118 of the secondary UAV 108 may include a cellular interface 116 and a local interface 120. The cellular interface 124 and the cellular interface 116 may each include a cellular transceiver that is configured to communicate with a wireless carrier network. The local interface 122 and the local interface 120 may communicate with each other using a wired or wireless connection. If the local interface 122 and the local interface 120 communicate over a wired connection, then the connection could be USB, ethernet, or any other similar wired communication technique. If the local interface 122 and the local interface 120 communicate over a wireless connection, then the connection could be over short-range radio, infrared, radio-frequency identification, radio frequency, or any other similar wireless communication technique.

From the perspective of the base station 104, the primary UAV 106 and the secondary UAV 108 may appear as one device. The base station 104 may transmit a communication to the group of UAVs that includes the primary UAV 106 and the secondary UAV 108 and may receive one communication in response. When either of the primary UAV 106 or the secondary UAV 108 attempts to communicate with the base station 104, the primary UAV 106 may select which of the primary UAV 106 or the secondary UAV 108 transmits the communication. The communication may appear to come from the group of UAVs, and the base station 104 may be unable to distinguish whether the primary UAV 106 or the secondary UAV 108 transmitted the communication. In other words, the base station 104 may not be able to direct a communication specifically to either the primary UAV 106 or the secondary UAV 108, and the primary UAV 106 or the secondary UAV 108 may share the same identifier on the wireless carrier network.

The base station 104 may be included in a wireless carrier network that provides voice and data communication services to multiple subscriber devices, such as the primary UAV 106, the secondary UAV 108, or other devices such as mobile phones. The wireless carrier network may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), 5th Generation (5G) wireless systems, CDMA-2000 (Code Division Multiple Access 2000), and/or other similar standards.

The wireless carrier network may include a radio access network and a core network 102. The radio access network may include multiple base stations, such as base station 104. The multiple base stations are responsible for handling voice and data traffic between multiple subscriber devices, such as the primary UAV 106 and the secondary UAV 108, and the core network 102. Accordingly, each of the base stations may provide a corresponding network cell that delivers telecommunication and data communication coverage. The core network 102 may use the network cells to provide communication services to the multiple subscriber devices. For example, the core network 102 may connect the multiple subscriber devices to other telecommunication and data communication networks, such as the Internet and the public switched telephone network (PSTN). The base stations are responsible for handling voice and data traffic between user devices and the core network 102. In some implementations, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from subscriber devices. In some implementations, the group of UAVs that includes the primary UAV 106 and the secondary UAV 108 may appear to the wireless carrier network as one subscriber device.

While the primary UAV 106 and the secondary UAV 108 are navigating, the base station 104 transmits a communication. The cellular interface 124 of the primary UAV 106 detects the communication, and the cellular interface 116 of the secondary UAV 116 detects the communication. Each of the primary UAV 106 and the secondary UAV 108 independently detects the signal of the communication.

In stage B, the primary UAV 106 analyzes the signal of the communication as detected by the cellular interface 124, and the secondary UAV 108 analyzes the signal of the communication as detected by the cellular interface 116. In some implementations, the primary UAV 106 and the secondary UAV 108 may automatically analyze the received signal in response to receiving the signal. In this case, the primary UAV 106 or the secondary UAV 108 may store instructions that cause one or more processors to analyze received signals. Each may include this instruction because of the selection process that involves selecting a UAV to respond to the communication.

In some implementations, the primary UAV 106 and the secondary UAV 108 may provide a notification to each other indicating that each has detected a communication from the base station 104. The communication may include a unique identifier for the group that includes the primary UAV 106 and the secondary UAV 108 indicating that the communication is intended for the group that includes the primary UAV 106 and the secondary UAV 108. The notification may include data identifying the base station, a timestamp of the receipt of the communication, a fingerprint of the communication, a hash of the communication, and/or any other identifier of the communication. If the primary UAV 106 or the secondary UAV 108 received a similar communication, then the primary UAV 106 or the secondary UAV 108 may analyze the signal of the communication.

The signal analyzer 128 of the primary UAV 106 may analyze the signal as received by the cellular interface 124 and determine the signal strength, the signal-to-noise ratio, the signal-to-interference-plus-noise ratio, and/or any other similar signal parameters. The signal analyzer 128 may be software or executable instructions embodied in computer-readable media included in or accessible by the primary UAV 106. The signal analyzer 114 of the secondary UAV 108 may analyze the signal as received by the cellular interface 116 and determine the signal strength, the signal-to-noise ratio, the signal-to-interference-plus-noise ratio, and/or any other similar signal parameters. The signal analyzer 114 may be software or executable instructions embodied in computer-readable media included in or accessible by the secondary UAV 108.

In stage C, the signal analyzer 128 may store the signal parameters in the detected signal parameters storage 132 of the signal parameters storage 130. For example, the signal analyzer 128 may determine that the signal strength of the signal is −85 dBm and the signal-to-noise ratio is 15 dB. The signal analyzer 128 may store these parameters in the signal parameters storage 132. The signal analyzer 114 may store the signal parameters in the signal parameters storage 110. For example, the signal analyzer 114 may determine that the signal strength of the signal is −75 dBm and the signal-to-noise ratio is 20 dB. The signal analyzer 114 may store these parameters in the signal parameters storage 110.

In some implementations, the primary UAV 106 and the secondary UAV 108 may also determine flight parameters of each UAV. The flight parameters may include the altitude, speed, orientation, and any other similar measurement. The primary UAV 106 and the secondary UAV 108 may determine the flight parameters during detection of a signal or a period of time after detection of the signal. For example, the primary UAV 106 may receive the signal from the base station and determine the flight parameters of the primary UAV 106 two hundred milliseconds after receiving the signal. As another example, the primary UAV 106 may determine the flight parameters after determining the signal parameters.

In some implementations, the UAV 106 and the secondary UAV 108 may continuously determine flight parameters of each UAV. In this case, the UAV 106 and the secondary UAV 108 may, at periodic intervals, determine the flight parameters. The periodic intervals may be every second, every ten seconds, or any other period of time.

The primary UAV 106 and the secondary UAV 108 may store the flight parameters in the primary flight parameters storage 142 and the flight parameters storage 112, respectively. Along with the flight parameters, the primary UAV 106 and the secondary UAV 108 may also store timestamp data for each flight parameter record.

The secondary UAV 108 provides the flight parameters and the signal parameters to the primary UAV 106. In some implementations, the secondary UAV 108 may provide the flight parameters and the signal parameters in response to a request from the primary UAV 106. For example, based on receiving the communication from the base station 104 in stage A, the primary UAV 106 may request that the secondary UAV 108 provide the flight parameters and the signal parameters. In some implementations, the secondary UAV 108 may automatically provide the flight parameters and the signal parameters to the primary UAV 106 in response to receiving the communication from the base station 104 in stage A.

In the example shown in FIG. 1, the secondary UAV 108 provides, to the primary UAV 106, signal parameters that indicate that the signal strength of the signal from the base station 104 is −75 dBm and the signal-to-noise ratio is 20 dB. The secondary UAV 108 provides, to the primary UAV 106, flight parameters that indicate that the altitude is 100 meters, the speed is five miles per hour, and the orientation is NNW. The orientation may indicate what direction the front or any other predesignated part of the secondary UAV 108 is pointing.

The primary UAV 106 receives the signal parameters from the secondary UAV 108 and stores them in the received signal parameters storage 134 of the signal parameters storage 130. The primary UAV 106 receives the flight parameters from the secondary UAV 108 and stores them in the secondary flight parameters storage 144 of the flight parameters storage 146.

The primary UAV 106 stores the signal parameters of the signal that the primary UAV 106 detected in the detected signal parameters storage 132 of the signal parameters storage 130. For example, the primary UAV 106 may store signal parameters that indicate that the signal strength of the signal from the base station 104 is −85 dBm and the signal-to-noise ratio is 15 dB. The primary UAV 106 stores the flight parameters of the primary UAV 106 in the primary flight parameters storage 142 of the flight parameters storage 146. For example, the primary UAV 106 may store flight parameters that indicate that the altitude is 98 meters, the speed is five miles per hour, and the orientation is SW.

In stage D, the communications manager 138 analyzes the signal parameters stored in the signal parameters storage 130. The communications manager 138 may be software or executable instructions embodied in computer-readable media included in or accessible by the primary UAV 106. Based on the detected signal parameters 132 and the received signal parameters 134, the communications manager 138 generates a communication assignment for the primary UAV 106 and the secondary UAV 108. The communications manager 138 stores the communication assignment in the communication assignments storage 140. The communication assignment may indicate whether the UAV should attempt to communicate with the base station 104 or whether the UAV should not attempt to communicate with the base station 104. In the example shown in FIG. 1, the communications manager 138 determines that the primary UAV 106 should not respond to the communication from the base station 104 and that the secondary UAV 108 should respond to the communication from the base station 104.

In some implementations, the communications manager 138 may use one or more rules to determine which UAV should respond to the communication from the base station 104. The rules may specify how to compare the signal parameters of the UAVs to determine which should respond. As an example, a rule may specify that the UAV with the highest signal strength may respond to the communication. As another example, a rule may specify that the UAV with the highest signal strength and a signal-to-noise ratio less than a threshold may respond to the communication.

In some implementations, the rules may specify how much of the previous signal parameters to use to determine which UAV should respond to the communication from the base station 104. A rule may specify to analyze the previous signal parameters determined over a period of time and/or the previous signal parameters of collected from a particular number of signals. For example, a rule may specify to analyze the signal parameters determined over the previous ten seconds, minute, and/or five minutes. As another example, a rule may specify to analyze the signal parameters determined from the last five, ten, or twenty signals received.

In stage E, the flight manager 136 analyzes the flight parameters stored in the flight parameters storage 146. The flight manager 136 may be software or executable instructions embodied in computer-readable media included in or accessible by the primary UAV 106. Based on primary flight parameters 142 and the secondary flight parameters 144, the flight manager 136 generates flight instructions for the primary UAV 106 and the secondary UAV 108. The flight manager 136 may store the flight instructions in the memory of the primary UAV 106, implement the flight instructions for the primary UAV 106, and/or provide the flight instructions for the secondary UAV 108 to the secondary UAV 108. In the example shown in FIG. 1, the flight manger 136 determines that the flight instructions for the primary UAV 106 are to increase the altitude two meters. The flight manger 136 determines that the flight instructions for the secondary UAV 108 are to maintain the current flight parameters.

The primary UAV 106 and the secondary UAV 108 may be following a flight itinerary and/or responding to remote flying instructions. The itinerary or the instructions may provide rough guidance to the primary UAV 106 and the secondary UAV 108 for where to fly. For example, the flight itinerary may provide a destination, route, altitude, and/or speed instructions for the primary UAV 106 and the secondary UAV 108. The altitude may be a range, such as one hundred meters, plus or minus five meters. The route may allow the primary UAV 106 and the secondary UAV 108 to deviate up to ten meters from a route. The speed may be a range, such as five miles per hour, plus or minus two miles per hour.

The flight manager 136 may be configured to adjust the flight parameters so that the flight parameters remain within the specifications of the flight itinerary or remote instructions while adjusting the flight parameters to improve communication with the base station 104 and/or other base stations. The flight manager 136 may use one or more rules to determine how to adjust the flight parameters of the primary UAV 106 and the secondary UAV 108. The rules may specify how to compare the signal parameters and the flight parameters of the UAVs to determine how to adjust the flight parameters. As an example, a rule may specify that the orientation of the UAV with the highest signal strength should be mimicked by the other UAVs. As another example, a rule may specify that the average of the altitudes of the UAVs should equal the altitude of the UAVs with the highest signal strength.

In some implementations, the rules may specify how much of the previous flight parameters and signal parameters to use to determine how to adjust the flight parameters. A rule may specify to analyze the previous flight parameters and signal parameters determined over a period of time and/or the previous flight parameters and signal parameters collected or determined from during receipt of a particular number of signals. For example, a rule may specify to analyze the previous flight parameters and signal parameters determined over the previous ten seconds, minute, and/or five minutes. As another example, a rule may specify to analyze the previous flight parameters and signal parameters determined during receipt of the last five, ten, or twenty signals received.

In some implementations, the flight manager 136 may attempt to maintain a constant distance between the primary UAV 106 and the secondary UAV 108. The distance may be predetermined based on the flight itinerary, the type of the UAV, the task assigned to the primary UAV 106 and the secondary UAV 108, the weather, and/or any other similar factor. The flight manager 136 may provide instructions to the secondary UAV 108 to move to maintain the constant distance, and/or the flight manager 136 may adjust the flight parameters of the primary UAV 106 to maintain the constant distance.

In some implementations, the flight manager 136 may attempt to adjust the distance between the primary UAV 106 and the secondary UAV 108. The flight manager 136 may coordinate with the communications manager 138 to determine a distance that improves connectivity between the primary UAV 106 and the secondary UAV 108 and the base station 104. The flight manager and the communications manager 138 may determine a distance based on the flight parameters and/or the signal parameters of either or both of the primary UAV 106 and the secondary UAV 108. The distance may be based on a rule that indicates a distance to maintain based on various signal parameters, the flight parameters, and/or the distance between the primary UAV 106 and/or the secondary UAV 108 and the base station. For example, a rule may indicate that the distance should be between two and three meters if the signal strength is between −70 dBm and −65 dBm.

The flight manager 136 may determine a distance between the primary UAV 106 and the secondary UAV 108 using one or more of several techniques. The flight manager 136 may determine the distance based on a time to communicate between the primary UAV 106 and the secondary UAV 108 using the local interface 122 and the local interface 120. The flight manager 136 may determine the distance based on the timing of the receipt of a communication by both the primary UAV 106 and the secondary UAV 108 from the base station 104.

As an example, the primary UAV 106 and the secondary UAV 108 may be surveying an area of one square kilometer. The flight instructions may specify to survey the area from an altitude between ninety to one hundred ten meters. The flight manager 136 may instruct the primary UAV 106 and the secondary UAV 108 to adjust their altitude to both be within the specified range and to improve communication with the base station 104. The flight manager 136 may determine that the cellular interface 124 and/or the cellular interface 116 may have a more robust connection with the base station 104 while flying at ninety-five meters rather other altitudes in the specified range. In some instances, the flight manager 136 may determine that other altitudes improve communication when the primary UAV 106 and the secondary UAV 108 are located in a different part of the square kilometer.

In stage F, the primary UAV 106 provides the updated flight parameters 148 and the communication instructions 150 to the secondary UAV 108. The primary UAV 106 may provide the updated flight parameters 148 and the communication instructions 150 in response to determining the updated flight parameters 148 and the communication instructions 150. The primary UAV 106 also implements the updated flight parameters 152 and communication instructions 154 for the primary UAV 106. In the example shown in FIG. 1, the primary UAV 106 increases the altitude by two meters, maintains an orientation of southwest, maintains a speed of five miles per hour, and does not respond to the communication. The primary UAV 106 provides the updated flight parameters 148 and the communication instructions 150 to the secondary UAV 108 using the local interface 122. The local interface 120 receives the updated flight parameters 148 and the communication instructions 150 from the local interface 122.

The secondary UAV 108 implements the updated flight parameters 148 and the communication instructions 150. In the example shown in FIG. 1, the secondary UAV 108 maintains the flight parameters of one hundred meters altitude, speed of five miles per hour, and an orientation of NNW.

In stage G, the secondary UAV 108 transmits the response to the base station 104. The response may identify the group of UAVs that includes the primary UAV 106 and the secondary UAV 108. This way, the base station 104 may be unable to determine which UAV transmitted the response. In some implementations, the secondary UAV 108 may continue to transmit data to the base station 104 until the base station 104 transmits an additional communication to the primary UAV 106 and the secondary UAV 108. If the base station 104 transmits an additional communication, then the primary UAV 106 and the secondary UAV 108 may repeat stages A through G. In some implementations, the secondary UAV 108 may transmit data to the primary UAV 106 indicating that the secondary UAV 108 transmitted the response.

In some implementations, the communications manager 138 may determine that each of the primary UAV 106 and the secondary UAV 108 have approximately an equally strong connection with the base station 104. In this case, the communications manager 138 may determine to have each of the primary UAV 106 and the secondary UAV 108 communicate with the base station. The communications manager 138 may determine to have both the primary UAV 106 and the secondary UAV 108 transmit the same communication to the base station 104. This communication may indicate that both communications are duplicates of each other. The communications 138 may determine to have the primary UAV 106 and the secondary UAV 108 alternate portions of the communication. For example, the primary UAV 106 may send the first twenty percent of the communication. The secondary UAV 108 may transmit the next twenty percent of the communication. The primary UAV 106 and the secondary UAV 108 may continue to alternate until the communication is complete. The communications manager 138 may determine to have the primary UAV 106 and the secondary UAV 108 each simultaneously transmit a portion of the communication. For example, the primary UAV 106 may send fifty percent of the communication, and, at the same time, the secondary UAV 108 may transmit the other fifty percent of the communication.

In some implementations, the group of UAVs that includes the primary UAV 106 and the secondary UAV 108 may include one or more additional UAVs. The additional UAVs may operate similarly to the secondary UAV 108 in that each will provide signal parameters and flight parameters to the primary UAV 106 and will receive flight instructions and communication instructions from the primary UAV 106. The flight manager 136 and the communication manager 138 determines communication instructions and flight instructions based on the signal parameters and flight parameters of the primary UAV 106 and each of the secondary UAVs.

In some implementations, the flight manager 136 may maintain a flying pattern for the group of UAVs. The flight manager 136 may determine a flying pattern in order to improve connectivity with the base station 104. The flight manager 136 and the communications manager 138 may determine a flying pattern based on the flight parameters and/or the signal parameters of one or more of the UAVs. The pattern determination may be based on a rule that specifies a pattern based on various signal parameters, the flight parameters, the distance from the base station 104, and/or any other similar factor. When the flight manager 136 determines a pattern, the flight manager 136 may determine the flight parameters to adjust on the primary UAV 106 and the flight instructions to provide to the other UAVs. Some of the patterns may include three UAVs in a triangle, four UAVs in a square or a rectangle, and/or five UAVs with the four secondary UAVs in a line and the primary UAV spaces apart at the middle of the line. If the UAVs are connected by a cable, then each UAV may be connected to the other UAVs or each of the secondary UAVs may be connected to the primary UAV.

In some implementations with more than two UAVs, the UAVs may communicate in a chain. The first UAV may communicate with the second UAV. The second UAV may communicate with the third UAV. The third UAV may communication with the fourth UAV, and so forth. If, for example, the third UAV transmitted flight parameters and signal parameters to the primary UAV, the transmission would be via the second UAV. In some implementations, each of the secondary UAVs may communicate directly with the primary UAV.

In some implementations, the primary UAV 106 may be unable to continue determining the flight instructions and/or the communication instructions for the group of UAVs. This may be because of damage to the primary UAV 106, a low battery of the primary UAV 106, and/or because of any other similar reason that would prevent the primary UAV 106 from determining the flight instructions and/or the communication instructions for the group of UAVs. In this case, the primary UAV 106 may determine that it is unable to continue determining the flight instructions and/or the communication instructions and provide an instruction to the secondary UAV 108 to begin determining the flight instructions and/or the communication instructions and operating as the primary UAV. The primary UAV 106 may then operate as a secondary UAV. In some instances, the primary UAV 106 may be damaged and unable to provide an instruction to the secondary UAV 108. To avoid the situation where the secondary UAV 108 waits for instructions, the primary UAV 106 may be configured to periodically transmit a signal to the secondary UAV 108 indicating that it is still able to determine the flight instructions and/or the communication instructions. If the secondary UAV 108 does not receive the signal within a specified time period, such as one minute, then the secondary UAV 108 may automatically begin operating as the primary UAV.

In some implementations, the flight manager 136 and the communications manager 138 may use one or more models to determine the flight parameters and the communication instructions for the group of UAVs. The models may be trained using machine learning and may be configured to output flight parameters and communication instructions. The models may be trained using historical data collected from groups of UAVs communicating with various base stations. Each of the groups may include various numbers of UAVs. The training data may be collected during receipt and/or transmission of a data. The training data may include, for each UAV, the signal strength of the received signal, the signal-to-noise ratio of the received signal, the signal-to-interference-plus-noise ratio of the received signal, the altitude of the UAV, the speed of the UAV, the orientation of the UAV, and the distance between the UAV and the base station. The training data may also include the pattern of the UAVs, the number of UAVs in the group, the height of the base station, and the one or more UAVs communicating with the base station. The training data may also include the bandwidth of the communication, the throughput of the communication, and the latency of the communication. The model may be trained using the training data and machine learning. In some instances, the training data may include a subset of these specified factors. The model may be configured to receive data similar to the training data and output adjustments to the pattern, orientation, altitude, speed, and/or distance to base station. The model may also be configured to identify the one or more UAV that should communicate with the base station. The model may be configured to maximize bandwidth and/or throughput and/or minimize latency.

In some implementations and after the primary UAV 106 and/or the secondary UAV 108 have adjusted their flight parameters, the primary UAV 106 and/or another computing device may collect flight parameters, signal parameters, and any other data similar to the data used to train the models. The models may be retrained with this additional data. In this way, the models may continue to improve and be able to output better adjustments to the flight parameters and more appropriate selections of the UAV to communicate with the base station.

Figure 2:
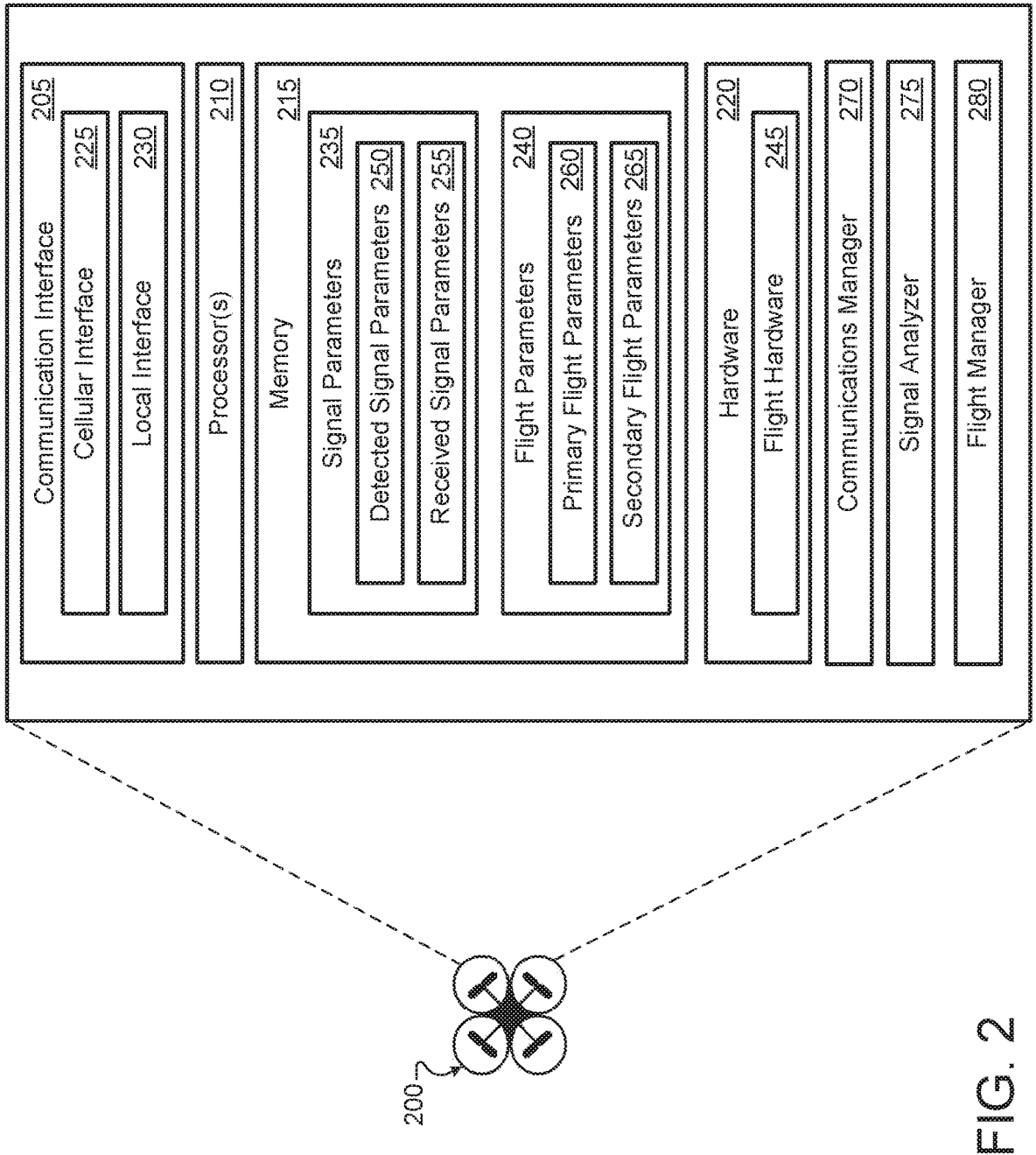
FIGS. 2 and 3 illustrate example UAVs.

FIG. 2 illustrates an example UAV 200. The UAV 200 may include any type of computing device that is configured to navigate an aerial space and communicate with a wireless carrier network. For example, the UAV 200 may be similar to the primary UAV 106. Some of the components of the UAV 200 may be implemented in a single computing device or distributed over multiple computing devices. Some of the components may be in the form of virtual machines or software containers that are hosted in a cloud in communication with disaggregated storage devices.

The UAV 200 may include a communication interface 205, one or more processors 210, memory 215, and hardware 220. The communication interface 205 may include wireless and/or wired communication components that enable the UAV 200 to transmit data to and receive data from other networked devices. The communication interface 205 may include a cellular interface 225 that is configured to communicate with base stations of a wireless carrier network. The communication interface 205 may include a local interface 230 that is configured to communicate with other UAVs. The local interface 230 may be a wired connection and/or a wireless connection. The local interface 230 may use short-range radio, infrared, microwaves, Wi-Fi, and/or any other similar wire communication technique. The local interface 230 may use a twisted pair of copper wires, a coaxial cable, fiber optic cable, or any other similar type of wired connection. In some implementations, the communication interface 205 may include an interface that is capable of communicating with both the base stations of a wireless carrier network and other UAVs.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices. The hardware 220 may include flight hardware 245 that is configured to move the UAV 200 through the air. The flight hardware 245 may include take-off and landing gear, motors, fans, flight sensors, and/or any other hardware used to navigate an air space.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a signal analyzer 275. The signal analyzer 275 may be similar to the signal analyzer 128 of FIG. 1. The signal analyzer 275 may be configured to analyze signals received by the cellular interface 225. The signal analyzer 275 may determine the amplitude, signal-to-noise ratio, signal-to-noise-plus-interference ratio, frequency, channel, bitrate, and any other similar signal parameters. In some implementations, the signal analyzer 275 may analyze each signal received by the cellular interface 225. In some implementations, the signal analyzer 275 may analyze signals at periodic intervals, such as every thirty seconds. In some implementations, the signal analyzer 275 may analyze every n-th signal received from the wireless carrier network. For example, the signal analyzer 275 may analyze every third signal received from the wireless carrier network. In some implementations, the signal analyzer 275 may analyze the signal received from the wireless carrier network if the UAV 200 changed location before the previous signal analysis. If the UAV 200 maintains the same location, then the signal analyzer 275 may not continue to analyze each incoming signal. The signal analyzer 275 may decrease the frequency of analyzing the signals while the UAV 200 is stationary. In some instances, the signal analyzer 275 may not analyze an incoming signal until the UAV 200 moves at lease a threshold distance and/or the orientation of the UAV 200 changes at least a threshold. In some implementations, the signal analyzer 275 may analyze the signals that have a signal strength above a threshold. For example, the signal analyzer 275 may analyze received signals if the signal strength is greater than −90 dBm. In some implementations, the signal analyzer 275 may analyze signals intended for the group of UAVs that includes the UAV 200.

The signal analyzer 275 may store the signal parameters in the detected signal parameters 250. The signal analyzer 275 may store a timestamp that indicates the time that the UAV 200 received the signal. The signal analyzer 275 may also store data identifying the data encoded in the signal. This may include a pointer to the data in memory 215, a hash of the data, a fingerprint of the data, and/or any other identifier for the data. The signal analyzer 275 may store additional data for the signal such as the amount of data encoded in the signal, the base station that transmitted the signal, and any other similar information.

In addition to the detected signal parameters 250, the signal parameters 235 include the received signal parameters 255. The received signal parameters 255 include data similar to the detected signal parameters 250 that were collected by other UAVs that are in the same group as the UAV 200. In addition to the data that is similar to the detected signal parameters 250, the received signal parameters 255 may also include data identifying the UAV that analyzed the signal. The detected signal parameters 250 and the received signal parameters 255 may include data analyzing the same signals transmitted from the same base stations and detected by different UAVs in the same group. The UAV 200 may receive the received signal parameters 255 through the local interface 230.

In some implementations, the detected signal parameters 250 and the received signal parameters 255 may store data identifying characteristics of the base station that transmitted each signal. The additional data may include the height of the base station, the number of antennas of the base station, the origination of the antennas of the base station, and any of other similar information. The UAV 200 may receive this data as part of the flight itinerary and/or the data may be included in the signals from the base stations.

The one or more processors 210 may implement a flight manager 280. The flight manager 280 may be similar to the flight manager 136 of FIG. 1. The flight manager 280 may be configured to determine various flight parameters of the UAV 200. The flight parameters may include the altitude, the speed, the orientation, and any other similar information. The flight manager 280 may determine the flight parameters at various points in time while the UAV 200 is navigating through the air. In some implementations, the flight manager 280 may determine the flight parameters during receipt of a signal from the base station. In this case, the flight parameters may be associated with the signal parameters determined at approximately the same time. In some implementations, the flight manager 280 may determine the flight parameters at periodic intervals, such as every fifteen seconds. In some implementations, the flight manager 280 may determine the flight parameters when the signal analyzer 275 determines the signal parameters. In some implementations, the flight manager 280 may determine the flight parameters when the UAV 200 moves at least a threshold distance. For example, if the UAV 200 moves at least one meter, then the flight manager 280 may determine the flight parameters. In some implementations, the flight parameters may include a current battery level, speeds of each motor, and/or positions of any rudders.

The flight manager 280 may store the flight parameters in the primary flight parameters 260. The flight manager 280 may store a timestamp that indicates the time that the flight manager 280 collected the flight parameters. In some implementations, the flight manager 280 may store data identifying the signal parameters that were collected at approximate the same time.

In addition to the primary flight parameters 260, the flight parameters 240 include the secondary flight parameters 265. The secondary flight parameters 265 include data similar to the primary flight parameters 260 and that were collected by other UAVs that are in the same group as the UAV 200. In addition to the data that is similar to the primary flight parameters 260, the secondary flight parameters 265 may also include data identifying the UAV with the stored flight parameters. The UAV 200 may receive the received signal parameters 255 through the local interface 230.

The one or more processors 210 may implement a communications manager 270. The communications manager 270 may be similar to the communications manager 138 of FIG. 1. The communications manager 270 may be configured to analyze the detected signal parameters 250, the received signal parameters 255, the primary flight parameters 260, and the secondary flight parameters 265 to determine whether the UAV 200 and/or another UAV should respond to a communication from the base station or whether the UAV and/or another UAV should transmit, to the base station, data that is not in response communication. For example, the UAV 200 and the other UAVs in the group may be collecting video data and transmitting the video data over the wireless carrier network as the UAVs collect the video data. The communications manager 270 may select the UAV to transmit the video data.

The communications manager 270 may use one or more rules and/or models to select the UAV to transmit data over the wireless carrier network. The rules may specify how to compare the detected signal parameters 250, the received signal parameters 255, the primary flight parameters 260, and/or the secondary flight parameters 265. For example, a rule may specify to compare the detected signal strength of each UAV. The UAV with the highest detected signal strength transmits the data over the wireless carrier network. As another example, the rule may specify that the UAV with the highest signal-to-noise ratio and with the detected signal strength greater than a threshold should transmit the data over the wireless carrier network.

The memory 215 may store the rules used by the communications manager 270. In some implementations, the rules may be based on the number of UAVs in the group. For example, a group of three UAVs may have different rules than a group with four UAVs. The memory 215 may store the rules before the group of UAVs launches.

The models used by the communications manager 270 may include models trained using machine learning and training data. The training data may be collected from various groups of UAVs. The training data may include historical data similar to the detected signal parameters 250, the received signal parameters 255, the primary flight parameters 260, and/or the secondary flight parameters 265. The training data may also include data identifying the UAV selected to communicate with the wireless carrier network. The training data may also include data identifying the bandwidth, throughput, latency, and/or any other network parameters that reflect the ability of the UAVs to communicate with the wireless carrier network. The models may be configured to receive the detected signal parameters 250, the received signal parameters 255, the primary flight parameters 260, and/or the secondary flight parameters 265 and output data identifying the UAV that should communicate with the wireless carrier network.

The memory 215 may store the models used by the communications manager 270. In some implementations, the memory 215 may store various models that are each configured to receive different data. For example, a model may be configured to receive altitude, among other inputs. Another model may be configured to receive signal-to-noise ratios. The communications manager 270 may select the model based on the data included in the detected signal parameters 250, the received signal parameters 255, the primary flight parameters 260, and/or the secondary flight parameters 265.

In some implementations, the communications manager 270 retrains the models using machine learning based on the previous selection of the UAVs. The communications manager 270 may receive, from the signal analyzer 275, data related to the quality of the connection between the selected UAV. The data related to the quality of the connection may include bandwidth, throughput, latency, and/or any other network parameters. The communications manager 270 may use this data, the detected signal parameters 250, the received signal parameters 255, the primary flight parameters 260, the secondary flight parameters 265, and/or the data identifying the selected UAV to update the model.

The flight manager 280 may also be configured to make any adjustments to the position of the UAVs relative to the base station and/or relative to each other. These adjustments may be in addition to the movements included in the itinerary. For example, the itinerary may include a destination, a flight path, an altitude, a speed, and/or any other relevant instructions. The flight manager 280 may adjust the flying pattern of the group of UAVs, the orientation of any of the UAVs, and/or the flight parameters, within a range of those specified in the itinerary. The flight manager 280 may make these adjustments to improve the connection between the group of the UAVs and the wireless carrier network.

In some implementations, the flight manager 280 may use one or more rules and/or models to determine whether to make any flight adjustments to the group of UAVs. The rules may specify how to adjust the pattern of the group, how to adjust the orientation of the UAVs, and other similar adjustments based on the detected signal parameters 250, the received signal parameters 255, the primary flight parameters 260, the secondary flight parameters 265, and/or the selected UAV. For example, a rule may specify to rotate the selected UAV to ensure that the antenna of the selected UAV is pointed towards the base station. The rule may also specify to ensure that no UAVs are in the line of sight between the selected UAV and the base station. The memory 215 may store the rules.

The models may be trained using machine learning and training data that includes historical data similar to the detected signal parameters 250, the received signal parameters 255, the primary flight parameters 260, and/or the secondary flight parameters 265, in addition to the orientation of each UAV, the selected UAV, the flying pattern of the group, and data indicating the quality of the connection between the group of UAVs and base station. The model may be configured to receive the detected signal parameters 250, the received signal parameters 255, the primary flight parameters 260, the secondary flight parameters 265, data identifying the selected UAV, and the flying pattern and output data indicating any adjustments that should be made to any of the UAVs. The flight manager 280 may adjust the flight parameters as specified by the model and/or the rules.

In some implementations, the flight manager 280 is configured to retrain the models using machine learning based on the previous adjustments to the UAVs. The flight manager 280 may receive, from the signal analyzer 275, data related to the quality of the connection between the selected UAV. The data related to the quality of the connection may include bandwidth, throughput, latency, and/or any other network parameters. The flight manager 280 may use this data, the detected signal parameters 250, the received signal parameters 255, the primary flight parameters 260, the secondary flight parameters 265, and/or the data identifying the flight adjustments to update the model.

The selections and determinations made by the communications manager 270 and/or the flight manager 280 may implemented by the processor 210 or transmitted to the other UAVs in the group using the local interface 230. If the communications manager 270 selects the UAV 200, then the communications manager 270 uses the cellular interface 225 to communicate with the base station. If the communications manager 270 selects another UAV, then the communications manager 270 provides those instructions to the selected UAV using the local interface 230. If the flight manager 280 determines adjustments to the UAV 200, then the flight manager 280 implements those changes. If the flight manager 280 determines adjustments to another UAV, then the flight manager 280 provides those instructions to the other UAV using the local interface 230.

Figure 3:
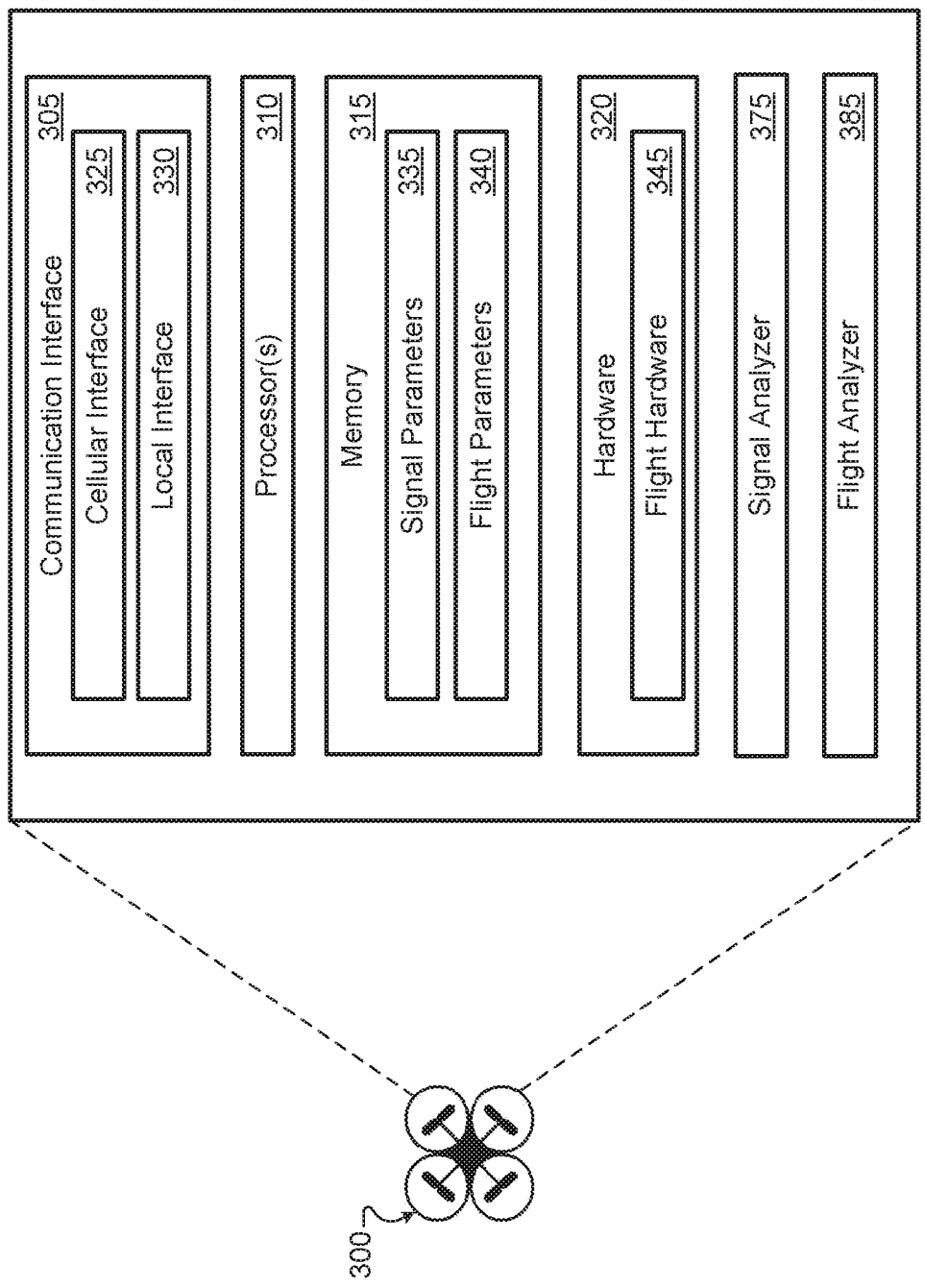

FIG. 3 illustrates an example UAV 300. The UAV 300 may include the type of computing device that is configured to navigate an aerial space and communicate with a wireless carrier network. For example, the UAV 300 may be similar to the secondary UAV 108. Some of the components of the UAV 300 may be implemented in a single computing device or distributed over multiple computing devices. Some of the components may be in the form of virtual machines or software containers that are hosted in a cloud in communication with disaggregated storage devices.

The UAV 300 may include a communication interface 305, one or more processors 310, memory 315, and hardware 320. The communication interface 305 may include wireless and/or wired communication components that enable the UAV 300 to transmit data to and receive data from other networked devices. The communication interface 305 may include a cellular interface 325 that is configured to communicate with base stations of a wireless carrier network. The communication interface 305 may include a local interface 330 that is configured to communicate with other UAVs. The local interface 330 may be a wired connection and/or a wireless connection. The local interface 330 may use short-range radio, infrared, microwaves, Wi-Fi, and/or any other similar wire communication technique. The local interface 330 may use a twisted pair of copper wires, a coaxial cable, fiber optic cable, or any other similar type of wired connection. In some implementations, the communication interface 305 may include an interface that is capable of communicating with both the base stations of a wireless carrier network and other UAVs.

The hardware 320 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices. The hardware 320 may include flight hardware 345 that is configured to move the UAV 300 through the air. The flight hardware 345 may include takeoff and landing gear, motors, fans, flight sensors, and/or any other hardware used to navigate an air space.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 310 may implement a signal analyzer 375. The signal analyzer 375 may be similar to the signal analyzer 114 of FIG. 1. The signal analyzer 375 may be configured to analyze signals received by the cellular interface 325. The signal analyzer 375 may determine the amplitude, signal-to-noise ratio, signal-to-noise-plus-interference ratio, frequency, channel, bitrate, and any other similar signal parameters. In some implementations, the signal analyzer 375 may analyze each signal received by the cellular interface 325. In some implementations, the signal analyzer 375 may analyze signals at periodic intervals, such as every thirty seconds. In some implementations, the signal analyzer 375 may analyze every n-th signal received from the wireless carrier network. For example, the signal analyzer 375 may analyze every third signal received from the wireless carrier network. In some implementations, the signal analyzer 375 may analyze the signal received from the wireless carrier network if the UAV 300 changed location before the previous signal analysis. If the UAV 300 maintains the same location, then the signal analyzer 375 may not continue to analyze each incoming signal. The signal analyzer 375 may decrease the frequency of analyzing the signals while the UAV 300 is stationary. In some instances, the signal analyzer 375 may not analyze an incoming signal until the UAV 300 moves at lease a threshold distance and/or the orientation of the UAV 300 changes at least a threshold. In some implementations, the signal analyzer 375 may analyze the signals that have a signal strength above a threshold. For example, the signal analyzer 375 may analyze received signal if the signal strength is greater than −90 dBm. In some implementations, the signal analyzer 375 may analyze the received signal in response to an instruction from another UAV, such as another unmanned vehicle in the same group, or another computing device. In some implementations, the signal analyzer 375 may analyze signals intended for the group of UAVs that includes the UAV 300.

The signal analyzer 375 may store the signal parameters in the signal parameters 335. The signal analyzer 375 may store a timestamp that indicates the time that the UAV 300 received the signal. The signal analyzer 375 may also store data identifying the data encoded in the signal. This may include a pointer to the data in memory 315, a hash of the data, a fingerprint of the data, and/or any other identifier for the data. The signal analyzer 375 may store additional data for the signal such as the amount of data encoded in the signal, the base station that transmitted the signal, and any other similar information.

In some implementations, the signal parameters 335 may store data identifying characteristics of the base station that transmitted each signal. The additional data may include the height of the base station, the number of antennas of the base station, the origination of the antennas of the base station, and any of other similar information. The UAV 300 may receive this data as part of the flight itinerary and/or the data may be included in the signals from the base stations.

The one or more processors 310 may implement a flight analyzer 385. The flight analyzer 385 may be included in the secondary UAV 108 of FIG. 1. The flight analyzer 385 may be configured to determine various flight parameters of the UAV 300. The flight parameters may include the altitude, the speed, the orientation, and any other similar information. The flight analyzer 385 may determine the flight parameters at various points in time while the UAV 300 is navigating through the air. In some implementations, the flight analyzer 385 may determine the flight parameters during receipt of a signal from the base station. In this case, the flight parameters may be associated with the signal parameters determined at approximately the same time. In some implementations, the flight analyzer 385 may determine the flight parameters at periodic intervals, such as every fifteen seconds. In some implementations, the flight analyzer 385 may determine the flight parameters when the signal analyzer 375 determines the signal parameters. In some implementations, the flight analyzer 385 may determine the flight parameters when the UAV 300 moves at least a threshold distance. For example, if the UAV 300 moves at least one meter, then the flight analyzer 385 may determine the flight parameters. In some implementations, the flight analyzer 385 may determine the flight parameters in response to an instruction from another UAV, such as another unmanned vehicle in the same group, or another computing device. In some implementations, the flight parameters may include a current battery level, speeds of each motor, and/or positions of any rudders.

The flight analyzer 385 may store the flight parameters in the flight parameters 340. The flight analyzer 385 may store a timestamp that indicates the time that the flight analyzer 385 collected the flight parameters. In some implementations, the flight analyzer 385 may store data identifying the signal parameters that were collected at approximately the same time.

The UAV 300 may transmit the data stored in the signal parameters 335 and the data stored in the flight parameters 340 to another UAV in the group of UAVs that includes the UAV 300. In some implementations, the UAV 300 may transmit the data in response to a request from the other UAV. In some implementations, the UAV 300 may transmit the data at periodic intervals, such as every thirty seconds. In some implementations, the UAV 300 may transmit the data after receipt of each signal from the base station and/or when the data is stored in the signal parameters 335 and/or the flight parameters 340.

While navigating, the UAV 300 may receive, through the local interface 330, flight instructions and/or communication instructions from the primary UAV in the group such as the UAV 200 of FIG. 2 and/or the primary UAV 106 of FIG. 1. The flight instructions may specify to change the altitude, speed, orientation, or another flight parameter of the UAV 300. The communication instructions may specify to transmit a communication to the base station using the cellular interface 325. The communication instructions may include the data to transmit or may indicate what data to transmit. The processor 310 may generate a reply to the sender of the instructions after execution of the instructions or after attempting to execute the instructions. The UAV 300 may transmit the reply through the local interface 330. In some instances, the UAV 300 may be unable to execute the instructions. This may be the case if the UAV 300 is damaged and/or the battery power is too low. In this case, the sender of the instructions may select another UAV to execute the instructions in the case of the instructions being instructions to communicate with the base station.

In some implementations, the UAV 300 may be configured to assume the responsibilities of the primary UAV in the group such as the UAV 200 of FIG. 2 and/or the primary UAV 106 of FIG. 1. These responsibilities may be similar to those performed by the communications manager 270, such as analyzing signal parameter and flight parameters to select one or more of the UAVs to communicate with the base station. The responsibilities may also be similar to those performed by the flight manager 280 such as adjusting the flight parameters of one or more of the UAVs.

FIG. 4 is a flowchart of an example process 400 for communicating with a base station using a group of UAVs. In general, the process 400 receives a communication from the base station. The process 400 determines signal parameters of that communication and additional signal parameters from other UAVs in the group. Based on the signal parameters, the process 400 selects one or more of the UAVs to respond to the communication. The process 400 will be described as being performed by the primary UAV 106 of FIG. 1 and will include references to other components in FIG. 1. The process 400 may also be performed by the UAV 200 of FIG. 2 and/or the UAV 300 of FIG. 3.

The primary UAV 106 includes a first transceiver and receives a communication from a base station (410). The primary UAV 106 may be moving in a group of UAVs that includes the primary UAV 106, the secondary UAV 108, and any additional UAVs. The first transceiver may be a communications interface that is configured to communicate with the various base stations of a wireless carrier network. The primary UAV 106, the secondary UAV 108, and any additional UAVs may communicate through the first transceiver or through an additional transceiver that is configured to communicate locally using a short-range radio, infrared, Wi-Fi, or any other similar wireless communication technique. In some implementations, the primary UAV 106, the secondary UAV 108, and any additional UAVs may be connected through cables. The primary UAV 106, the secondary UAV 108, and any additional UAVs may communicate locally over those cables instead of using the additional transceiver.

The primary UAV 106, the secondary UAV 108, and any additional UAVs may operate as a group such that the wireless carrier network appears to be communicating with only one device. Each may detect the communication from the base station of the wireless carrier network, including the primary UAV 106.

The primary UAV 106 receives, from a secondary UAV 108 that includes a second transceiver, data indicating that the secondary UAV received the communication from the base station (420). The secondary UAV 108 may have received the communication from the base station at approximately the same time that the primary UAV 106 received the communication. The secondary UAV 108 may transmit, through a local transceiver of the secondary UAV 108, the data indicating that the secondary UAV 108 received the communication to indicate that the secondary UAV 108 successfully received the communication. The primary UAV 106 may receive the data indicating that the secondary UAV 108 received the communication through a local transceiver of the primary UAV 106. In some implementations, the secondary UAV 108 may not transmit the data indicating that the secondary UAV received the communication to the primary UAV 106. This may occur if the primary UAV 106 receives a communication from the base station and performs additional actions as if the secondary UAV 108 received the communication.

The primary UAV 106 determines first signal parameters of the communication (430). In some implementations, the primary UAV 106 determines the first signal parameters in response to receiving the data indicating that the secondary UAV 108 received the communication from the base station. In some implementations, the primary UAV 106 determines the first signal parameters in response to receiving the communication from the base station. The first signal parameters may include the signal strength of the communication, the signal-to-interference-plus-noise ratio, the signal-to-noise ratio, and/or any other similar signal parameters.

In some implementations, the primary UAV 106 may determine first flight parameters of the primary UAV 106. In some instances, the primary UAV 106 may determine the first flight parameters in response to receiving the data indicating that the secondary UAV 108 received the communication from the base station. In some instances, the primary UAV 106 may determine the first flight parameters in response to receiving the communication from the base station. The first flight parameters may include the altitude, the speed, orientation, and/or any other similar flight parameters.

The primary UAV 106 receives, from the secondary UAV 108, second signal parameters of the communication (440). In some implementations, the secondary UAV 108 determines the second signal parameters in response to receiving an instruction from the primary UAV 106. In some implementations, the secondary UAV 108 determines the second signal parameters in response to receiving the communication from the base station. The second signal parameters may include data similar to the first signal parameters such as the signal strength of the communication, the signal-to-interference-plus-noise ratio, the signal-to-noise ratio, and/or any other similar signal parameters.

In some implementations, the primary UAV 106 may request the second signal parameters from the secondary UAV 108. In some implementations, the secondary UAV 108 may transmit the second signal parameters to the primary UAV 106 in response to receiving the communication from the base station.

Based on the first signal parameters and the second signal parameters, the primary UAV 106 selects the primary UAV 106 or the secondary UAV 108 to transmit a reply communication to the base station (450). The primary UAV 106 selects the primary UAV 106 or the secondary UAV 108 using rules and/or models to select the UAV that has the best connection with the base station. The best connection may be the one with the highest bandwidth, lowest latency, highest signal strength, and/or lowest signal-to-noise ratio. The best connection may also be the connection that has the best chance of transmitting the data without errors.

In some implementations, the primary UAV 106 selects the primary UAV 106 or the secondary UAV 108 to transmit the reply communication to the base station based further on the first flight parameters and/or the second flight parameters. In some implementations, the primary UAV 106 adjusts the flight parameters of the primary UAV 106 before, after, or during transmission of the reply communication to the base station In some implementations, the primary UAV 106 adjusts the flight parameters of the secondary UAV 1018 before, after, or during transmission of the reply communication to the base station.

In the case of the primary UAV 106 selecting the primary UAV 106 to transmit the reply, the primary UAV 106 transmits, using the first transceiver, the reply communication to the base station. In some implementations, the primary UAV 106 transmits, to the secondary UAV 108 and using the local communications interface, data indicating that the primary UAV 106 selecting the primary UAV 106.

In the case of the primary UAV 106 selecting the secondary UAV 108 to transmit the reply, the primary UAV 106 transmits, using the local communications interface and to the secondary UAV 108, an instruction to transmit the reply communication to the base station.

In some implementations, the rules and/or models may indicate to use two or more of the primary UAV 106, the secondary UAV 108, and the other UAV in the group to transmit the communication. The rules and/or models may indicate to the two or more UAVs to transmit the same data to the base station, to alternate transmitting different portions of the data to the base station, to simultaneously transmit different portions of the data to the base station, and/or any other similar transmission technique.

In some implementations, primary UAV 106 and/or the secondary UAV 108 may include multiple antennas that are each in a different location on the UAV. The rules and/or models may specify which antenna the selected UAV should use to communicate with the base station. In some instances, the rules and/or models may specify to use more than one antenna of one or more UAVs to communicate with the base station.

FIG. 5 is a flowchart of an example process 500 for communicating with a base station using a group of UAVs. In general, the process 500 receives a communication from the base station. The process 500 determines signal parameters of that communication and transmits the signal parameters to another UAV in the group. The process 500 receives instructions from the other UAV in the group regarding responding to the communication or being idle. The process 500 will be described as being performed by the secondary UAV 108 of FIG. 1 and will include references to other components in FIG. 1. The process 500 may also be performed by the UAV 200 of FIG. 2 and/or the UAV 300 of FIG. 3.

The secondary UAV 108 includes a second communications interface and receives a communication from a base station 104 (510). The secondary UAV 108 may be moving in a group of UAVs that includes the primary UAV 106, the secondary UAV 108, and any additional UAVs. The second communications interface may be configured to communicate with the various base stations of a wireless carrier network. The primary UAV 106, the secondary UAV 108, and any additional UAVs may communicate through the local communications interface that is configured to communicate locally using a short-range radio, infrared, Wi-Fi, or any other similar wireless communication technique. In some implementations, the primary UAV 106, the secondary UAV 108, and any additional UAVs may be connected through cables. The primary UAV 106, the secondary UAV 108, and any additional UAVs may communicate locally over those cables instead of using the local communications interface.

The primary UAV 106, the secondary UAV 108, and any additional UAVs may operate as a group such that the wireless carrier network appears to be communicating with only one device. Each may detect the communication from the base station of the wireless carrier network, including the secondary UAV 108.

The secondary UAV 108 determines that a primary UAV 106 received the communication from the base station 104 (520). The primary UAV 106 may have received the communication from the base station at approximately the same time that the secondary UAV 108 received the communication. The secondary UAV 108 may use the local communications interface to transmit data indicating that secondary UAV 108 received the communication. The secondary UAV 108 may receive data from the primary UAV 106 indicating that the primary UAV 106 received the communication.

Based on determining that the primary UAV received the communication from the base station, the secondary UAV 108 determines second signal parameters of the communication (530). In some implementations, the secondary UAV 108 determines the second signal parameters in response to receiving the data indicating that the first UAV 106 received the communication from the base station. In some implementations, the secondary UAV 108 determines the second signal parameters in response to receiving the communication from the base station. The second signal parameters may include the signal strength of the communication, the signal-to-interference-plus-noise ratio, the signal-to-noise ratio, and/or any other similar signal parameters.

In some implementations, the secondary UAV 108 may determine second flight parameters of the secondary UAV 108. In some instances, the secondary UAV 108 may determine the second flight parameters in response to receiving the data indicating that the first UAV 106 received the communication from the base station. In some instances, the secondary UAV 108 may determine the second flight parameters in response to receiving the communication from the base station. The second flight parameters may include the altitude, the speed, orientation, and/or any other similar flight parameters.

The secondary UAV 108 provides, to the first UAV 106, the second signal parameters (540). In some implementations, the secondary UAV 108 provides the second signal parameters in response to receiving an instruction from the primary UAV 106. In some implementations, the secondary UAV 108 provides the second signal parameters in response to receiving the communication from the base station. In some implementations, the secondary UAV 108 provides the second flight parameters to the first UAV 106. The secondary UAV 108 may automatically, or in response to a request, provide the second flight parameters to the first UAV 106

In response to providing the second signal parameters, the secondary UAV 108 receives, from the primary UAV 104, an instruction regarding responding to the communication (550). The secondary UAV 108 may receive the instruction through the local communication interface. The instruction may be to transmit a response to the base station 104. In this case, the secondary UAV 108 transmits, using the second communications interface, the response to the base station. The instruction may be to remain idle. In this case, the secondary UAV 108 may not transmit any data to the base station. The instruction may be to transmit part of a response to the base station 104. In this case, the secondary UAV 108 transmits, using the second communications interface, the portion of the response to the base station. The instruction may identify one or more antennas of the secondary UAV 108 to use to transmit the response to the base station.

In some implementations, the secondary UAV 108 receives, from the primary UAV 106, an instruction to adjust the flight parameters of the secondary UAV 108. In this case, the secondary UAV 108 may adjust the flight parameters of the secondary UAV 108 before, after, or during any transmission to the base station 104 or as specified in the instructions.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   receiving, by a first unmanned aerial vehicle that includes a first transceiver, a first communication from a base station;
   receiving, by the first unmanned aerial vehicle and from a second unmanned aerial vehicle that includes a second transceiver, data indicating that the second unmanned aerial vehicle received the first communication from the base station;
   in response to receiving the data indicating that the second unmanned aerial vehicle received the first communication from the base station, determining, by the first unmanned aerial vehicle, first signal parameters of the first communication, wherein the first signal parameters indicate a first signal-to-interference-plus-noise ratio of the first communication or a first signal strength of the first communication;
   receiving, by the first unmanned aerial vehicle and from the second unmanned aerial vehicle, second signal parameters of the first communication, wherein the second signal parameters indicate a second signal-to-interference-plus-noise ratio of the first communication as determined by the second unmanned aerial vehicle or a second signal strength of the first communication as determined by the second unmanned aerial vehicle;
   based on the first signal parameters that indicate the first signal-to-interference-plus-noise ratio or the first signal strength of the first communication as determined by the first unmanned aerial vehicle and the second signal parameters that indicate the second signal-to-interference-plus-noise ratio or the second signal strength of the first communication as determined by the second unmanned aerial vehicle, outputting, by the first unmanned aerial vehicle and to the base station, a first reply communication to the first communication;
   after receiving the first communication:
      receiving, by the first unmanned aerial vehicle, a second communication from the base station; and
      receiving, by the first unmanned aerial vehicle and from the second unmanned aerial vehicle, data indicating that the second unmanned aerial vehicle received the second communication from the base station;
   in response to receiving the data indicating that the second unmanned aerial vehicle received the second communication from the base station, determining, by the first unmanned aerial vehicle, third signal parameters of the second communication, wherein the third signal parameters indicate a third signal-to-interference-plus-noise ratio of the second communication or a third signal strength of the second communication;
   receiving, by the first unmanned aerial vehicle and from the second unmanned aerial vehicle, fourth signal parameters of the second communication, wherein the fourth signal parameters indicate a fourth signal-to-interference-plus-noise ratio of the second communication as determined by the second unmanned aerial vehicle or a fourth signal strength of the second communication as determined by the second unmanned aerial vehicle;
   accessing, by the first unmanned aerial vehicle, a rule that specifies for the first unmanned aerial vehicle to determine whether the first unmanned aerial vehicle or the second unmanned aerial vehicle is to transmit, to the base station, a second reply communication to the second communication by analyzing (i) previous signal parameters of a previous communication received by the first unmanned aerial vehicle and the second unmanned aerial vehicle during a particular time period before receiving the second communication, (ii) the third signal parameters that indicate the third signalto-interference-plus-noise ratio or the third signal strength of the second communication as determined by the first unmanned aerial vehicle, and (iii) the fourth signal parameters that indicate the fourth signal-to-interference-plus-noise ratio or the fourth signal strength of the second communication as determined by the second unmanned aerial vehicle, wherein the previous signal parameters include (i) previous first signal parameters that indicate a previous first signal-to-interference-plus-noise ratio or a previous first signal strength of the previous communication as determined by the first unmanned aerial vehicle and (ii) previous second signal parameters that indicate a previous second signal-to-interference-plus-noise ratio or a previous second signal strength of the previous communication as determined by the second unmanned aerial vehicle;

determining, by the first unmanned aerial vehicle, that the first unmanned aerial vehicle and the second unmanned aerial vehicle received the first communication during the particular time period before the first unmanned aerial vehicle and the second unmanned aerial vehicle received the second communication;

based on (i) accessing the rule that specifies for the first unmanned aerial vehicle to determine whether the first unmanned aerial vehicle or the second unmanned aerial vehicle is to transmit, to the base station, the second reply communication to the second communication by analyzing (a) previous signal parameters of the previous communication received by the first unmanned aerial vehicle and the second unmanned aerial vehicle during a particular time period before receiving the second communication, (b) the third signal parameters that indicate the third signal-to-interference-plus-noise ratio or the third signal strength of the second communication as determined by the first unmanned aerial vehicle, and (c) the fourth signal parameters that indicate the fourth signal-to-interference-plus-noise ratio or the fourth signal strength of the second communication as determined by the second unmanned aerial vehicle and (ii) determining that the first unmanned aerial vehicle and the second unmanned aerial vehicle received the first communication during the particular time period before the first unmanned aerial vehicle and the second unmanned aerial vehicle received the second communication, analyzing, by the first unmanned aerial vehicle, the first signal parameters that indicate the first signal-to-interference-plus-noise ratio or the first signal strength of the first communication as determined by the first unmanned aerial vehicle, the second signal parameters that indicate the second signal-to-interference-plus-noise ratio or the second signal strength of the first communication as determined by the second unmanned aerial vehicle, the third signal parameters that indicate the third signal-to-interference-plus-noise ratio or the third signal strength of the second communication as determined by the first unmanned aerial vehicle, and the fourth signal parameters that indicate the fourth signal-to-interference-plus-noise ratio or the fourth signal strength of the second communication as determined by the second unmanned aerial vehicle;

based on analyzing the first signal parameters that indicate the first signal-to-interference-plus-noise ratio or the first signal strength of the first communication as determined by the first unmanned aerial vehicle, the second signal parameters that indicate the second signal-to-interference-plus-noise ratio or the second signal strength of the first communication as determined by the second unmanned aerial vehicle, the third signal parameters that indicate the third signal-to-interference-plus-noise ratio or the third signal strength of the second communication as determined by the first unmanned aerial vehicle, and the fourth signal parameters that indicate the fourth signal-to-interference-plus-noise ratio or the fourth signal strength of the second communication as determined by the second unmanned aerial vehicle, selecting, by the first unmanned aerial vehicle, the second unmanned aerial vehicle to transmit, to the base station, the second reply communication to the second communication;

based on selecting the second unmanned aerial vehicle to transmit, to the base station, the second reply communication to the second communication, generating, by the first unmanned aerial vehicle, flight instructions that include flight parameters for the second unmanned aerial vehicle;

determining, by the first unmanned aerial vehicle, characteristics of the first unmanned aerial vehicle;

based on the characteristics of the first unmanned aerial vehicle, determining, by the first unmanned aerial vehicle, for the second unmanned aerial vehicle to select whether the first unmanned aerial vehicle or the second unmanned aerial vehicle are to transmit a subsequent reply communication to the base station in response to receiving a subsequent communication from the base station; and providing, for output by the first unmanned aerial vehicle and to the second unmanned aerial vehicle, an instruction to (i) transmit, to the base station, the second reply communication to the second communication and the flight instructions that include the flight parameters for the second unmanned aerial vehicle and (ii) select whether the first unmanned aerial vehicle or the second unmanned aerial vehicle are to transmit the subsequent reply communication to the base station in response to receiving the subsequent communication from the base station.

2. The method of claim 1, comprising:

based on the first signal parameters that indicate the first signal-to-interference-plus-noise ratio or the first signal strength of the first communication as determined by the first unmanned aerial vehicle and the second signal parameters that indicate the second signal-to-interference-plus-noise ratio or the second signal strength of the first communication as determined by the second unmanned aerial vehicle and before selecting the second unmanned aerial vehicle to transmit the reply communication to the base station, determining to adjust an altitude of the first unmanned aerial vehicle or the second unmanned aerial vehicle.

3. The method of claim 1, comprising:

based on the first signal parameters that indicate the first signal-to-interference-plus-noise ratio or the first signal strength of the first communication as determined by the first unmanned aerial vehicle and the second signal parameters that indicate the second signal-to-interference-plus-noise ratio or the second signal strength of the first communication as determined by the second unmanned aerial vehicle and before selecting the second unmanned aerial vehicle to transmit the reply communication to the base station, determining to adjust a speed of the first unmanned aerial vehicle or the second unmanned aerial vehicle.

4. The method of claim 1, wherein the first unmanned aerial vehicle and the second unmanned aerial vehicle communicate with each other over through a wired communication channel.

5. The method of claim 1, wherein:
the first signal parameters comprise the first signal strength of the first communication, and
the second signal parameters comprise the second signal strength of the first communication.

6. The method of claim 1, wherein:
the first signal parameters comprise the first signal-to-interference-plus-noise ratio of the first communication,
the second signal parameters comprise the second signal-to-interference-plus-noise ratio of the first communication.

7. The method of claim 1, comprising:
receiving, by the first unmanned aerial vehicle, third communication from the base station;
receiving, by the first unmanned aerial vehicle and from the second unmanned aerial vehicle, data indicating that the second unmanned aerial vehicle received the third communication from the base station;
determining, by the first unmanned aerial vehicle, fifth signal parameters of the third communication, wherein the fifth signal parameters indicate a fifth signal-to-interference-plus-noise ratio of the third communication or a fifth signal strength of the third communication;
receiving, by the first unmanned aerial vehicle and from the second unmanned aerial vehicle, sixth signal parameters of the additional subsequent communication, wherein the sixth signal parameters indicate a sixth signal-to-interference-plus-noise ratio of the third communication as determined by the second unmanned aerial vehicle or a sixth signal strength of the third communication as determined by the second unmanned aerial vehicle; and
based on the fifth signal parameters that indicate the fifth signal-to-interference-plus-noise ratio or the fifth signal strength of the third communication as determined by the first unmanned aerial vehicle, the sixth signal parameters that indicate the sixth signal-to-interference-plus-noise ratio or the sixth signal strength of the third communication as determined by the second unmanned aerial vehicle, the first signal parameters that indicate the first signal-to-interference-plus-noise ratio or the first signal strength of the first communication as determined by the first unmanned aerial vehicle, the second signal parameters that indicate the second signal-to-interference-plus-noise ratio or the second signal strength of the first communication as determined by the second unmanned aerial vehicle, the third signal parameters that indicate the third signal-to-interference-plus-noise ratio or the third signal strength of the second communication as determined by the first unmanned aerial vehicle, and the fourth signal parameters that indicate the fourth signal-to-interference-plus-noise ratio or the fourth signal strength of the second communication as determined by the second unmanned aerial vehicle, determining, by the first unmanned aerial vehicle, that both the first unmanned aerial vehicle and the second unmanned aerial vehicle transmit third reply communication to the base station.

8. A first unmanned aerial vehicle, comprising:
one or more processors; and
memory including a plurality of computer-executable components that are executable by the one or more processors to perform a plurality of acts, the plurality of acts comprising:
receiving, by the first unmanned aerial vehicle that includes a first transceiver, a first communication from a base station;
receiving, by the first unmanned aerial vehicle and from a second unmanned aerial vehicle that includes a second transceiver, data indicating that the second unmanned aerial vehicle received the first communication from the base station;
in response to receiving the data indicating that the second unmanned aerial vehicle received the first communication from the base station, determining, by the first unmanned aerial vehicle, first signal parameters of the first communication, wherein the first signal parameters indicate a first signal-to-interference-plus-noise ratio of the first communication or a first signal strength of the first communication;
receiving, by the first unmanned aerial vehicle and from the second unmanned aerial vehicle, second signal parameters of the first communication, wherein the second signal parameters indicate a second signal-to-interference-plus-noise ratio of the first communication as determined by the second unmanned aerial vehicle or a second signal strength of the first communication as determined by the second unmanned aerial vehicle;
based on the first signal parameters that indicate the first signal-to-interference-plus-noise ratio or the first signal strength of the first communication as determined by the first unmanned aerial vehicle and the second signal parameters that indicate the second signal-to-interference-plus-noise ratio or the second signal strength of the first communication as determined by the second unmanned aerial vehicle, outputting, by the first unmanned aerial vehicle and to the base station, a first reply communication to the first communication;
after receiving the first communication:
receiving, by the first unmanned aerial vehicle, a second communication from the base station; and
receiving, by the first unmanned aerial vehicle and from the second unmanned aerial vehicle, data indicating that the second unmanned aerial vehicle received the second communication from the base station;
in response to receiving the data indicating that the second unmanned aerial vehicle received the second communication from the base station, determining, by the first unmanned aerial vehicle, third signal parameters of the second communication, wherein the third signal parameters indicate a third signal-to-interference-plus-noise ratio of the second communication or a third signal strength of the second communication;
receiving, by the first unmanned aerial vehicle and from the second unmanned aerial vehicle, fourth signal parameters of the second communication, wherein the fourth signal parameters indicate a fourth signal-to-interference-plus-noise ratio of the second communication as determined by the second unmanned aerial vehicle or a fourth signal strength of the second communication as determined by the second unmanned aerial vehicle;

accessing, by the first unmanned aerial vehicle, a rule that specifies for the first unmanned aerial vehicle to determine whether the first unmanned aerial vehicle or the second unmanned aerial vehicle is to transmit, to the base station, a second reply communication to the second communication by analyzing (i) previous signal parameters of a previous communication received by the first unmanned aerial vehicle and the second unmanned aerial vehicle during a particular time period before receiving the second communication, (ii) the third signal parameters that indicate the third signal-to-interference-plus-noise ratio or the third signal strength of the second communication as determined by the first unmanned aerial vehicle, and (iii) the fourth signal parameters that indicate the fourth signal-to-interference-plus-noise ratio or the fourth signal strength of the second communication as determined by the second unmanned aerial vehicle, wherein the previous signal parameters include (i) previous first signal parameters that indicate a previous first signal-to-interference-plus-noise ratio or a previous first signal strength of the previous communication as determined by the first unmanned aerial vehicle and (ii) previous second signal parameters that indicate a previous second signal-to-interference-plus-noise ratio or a previous second signal strength of the previous communication as determined by the second unmanned aerial vehicle;

determining, by the first unmanned aerial vehicle, that the first unmanned aerial vehicle and the second unmanned aerial vehicle received the first communication during the particular time period before the first unmanned aerial vehicle and the second unmanned aerial vehicle received the second communication;

based on (i) accessing the rule that specifies for the first unmanned aerial vehicle to determine whether the first unmanned aerial vehicle or the second unmanned aerial vehicle is to transmit, to the base station, the second reply communication to the second communication by analyzing (a) previous signal parameters of the previous communication received by the first unmanned aerial vehicle and the second unmanned aerial vehicle during a particular time period before receiving the second communication, (b) the third signal parameters that indicate the third signal-to-interference-plus-noise ratio or the third signal strength of the second communication as determined by the first unmanned aerial vehicle, and (c) the fourth signal parameters that indicate the fourth signal-to-interference-plus-noise ratio or the fourth signal strength of the second communication as determined by the second unmanned aerial vehicle and (ii) determining that the first unmanned aerial vehicle and the second unmanned aerial vehicle received the first communication during the particular time period before the first unmanned aerial vehicle and the second unmanned aerial vehicle received the second communication, analyzing, by the first unmanned aerial vehicle, the first signal parameters that indicate the first signal-to-interference-plus-noise ratio or the first signal strength of the first communication as determined by the first unmanned aerial vehicle, the second signal parameters that indicate the second signal-to-interference-plus-noise ratio or the second signal strength of the first communication as determined by the second unmanned aerial vehicle, the third signal parameters that indicate the third signal-to-interference-plus-noise ratio or the third signal strength of the second communication as determined by the first unmanned aerial vehicle, and the fourth signal parameters that indicate the fourth signal-to-interference-plus-noise ratio or the fourth signal strength of the second communication as determined by the second unmanned aerial vehicle;

based on analyzing the first signal parameters that indicate the first signal-to-interference-plus-noise ratio or the first signal strength of the first communication as determined by the first unmanned aerial vehicle, the second signal parameters that indicate the second signal-to-interference-plus-noise ratio or the second signal strength of the first communication as determined by the second unmanned aerial vehicle, the third signal parameters that indicate the third signal-to-interference-plus-noise ratio or the third signal strength of the second communication as determined by the first unmanned aerial vehicle, and the fourth signal parameters that indicate the fourth signal-to-interference-plus-noise ratio or the fourth signal strength of the second communication as determined by the second unmanned aerial vehicle, selecting, by the first unmanned aerial vehicle, the second unmanned aerial vehicle to transmit, to the base station, the second reply communication to the second communication;

based on selecting the second unmanned aerial vehicle to transmit, to the base station, the second reply communication to the second communication, generating, by the first unmanned aerial vehicle, flight instructions that include flight parameters for the second unmanned aerial vehicle;

determining, by the first unmanned aerial vehicle, characteristics of the first unmanned aerial vehicle;

based on the characteristics of the first unmanned aerial vehicle, determining, by the first unmanned aerial vehicle, for the second unmanned aerial vehicle to select whether the first unmanned aerial vehicle or the second unmanned aerial vehicle are to transmit a subsequent reply communication to the base station in response to receiving a subsequent communication from the base station; and providing, for output by the first unmanned aerial vehicle and to the second unmanned aerial vehicle, an instruction to (i) transmit, to the base station, the second reply communication to the second communication and the flight instructions that include the flight parameters for the second unmanned aerial vehicle and (ii) select whether the first unmanned aerial vehicle or the second unmanned aerial vehicle are to transmit the subsequent reply communication to the base station in response to receiving the subsequent communication from the base station.

9. The first unmanned aerial vehicle of claim 8, wherein the plurality of acts comprise:

based on the first signal parameters that indicate the first signal-to-interference-plus-noise ratio or the first signal strength of the first communication as determined by the first unmanned aerial vehicle and the second signal parameters that indicate the second signal-to-interference-plus-noise ratio or the second signal strength of the first communication as determined by the second unmanned aerial vehicle and before selecting the second unmanned aerial vehicle to transmit the reply communication to the base station, determining to adjust an altitude of the first unmanned aerial vehicle or the second unmanned aerial vehicle.

10. The first unmanned aerial vehicle of claim 8, wherein the plurality of acts comprise:
based on the first signal parameters that indicate the first signal-to-interference-plus-noise ratio or the first signal strength of the first communication as determined by the first unmanned aerial vehicle and the second signal parameters that indicate the second signal-to-interference-plus-noise ratio or the second signal strength of the first communication as determined by the second unmanned aerial vehicle and before selecting the second unmanned aerial vehicle to transmit the reply communication to the base station, determining to adjust a speed of the first unmanned aerial vehicle or the second unmanned aerial vehicle.

11. The first unmanned aerial vehicle of claim 8, wherein the first unmanned aerial vehicle and the second unmanned aerial vehicle communicate with each other over through a wired communication channel.

12. The first unmanned aerial vehicle of claim 8, wherein:
the first signal parameters comprise the first signal strength of the first communication, and
the second signal parameters comprise the second signal strength of the first communication.

13. The first unmanned aerial vehicle of claim 8, wherein:
the first signal parameters comprise the first signal-to-interference-plus-noise ratio of the first communication,
the second signal parameters comprise the second signal-to-interference-plus-noise ratio of the first communication.

14. The first unmanned aerial vehicle of claim 8, wherein the plurality of acts comprise:
receiving, by the first unmanned aerial vehicle, third communication from the base station;
receiving, by the first unmanned aerial vehicle and from the second unmanned aerial vehicle, data indicating that the second unmanned aerial vehicle received the third communication from the base station;
determining, by the first unmanned aerial vehicle, fifth signal parameters of the third communication, wherein the fifth signal parameters indicate a fifth signal-to-interference-plus-noise ratio of the third communication or a fifth signal strength of the third communication;
receiving, by the first unmanned aerial vehicle and from the second unmanned aerial vehicle, sixth signal parameters of the additional subsequent communication, wherein the sixth signal parameters indicate a sixth signal-to-interference-plus-noise ratio of the third communication as determined by the second unmanned aerial vehicle or a sixth signal strength of the third communication as determined by the second unmanned aerial vehicle; and
based on the fifth signal parameters that indicate the fifth signal-to-interference-plus-noise ratio or the fifth signal strength of the third communication as determined by the first unmanned aerial vehicle, the sixth signal parameters that indicate the sixth signal-to-interference-plus-noise ratio or the sixth signal strength of the third communication as determined by the second unmanned aerial vehicle, the first signal parameters that indicate the first signal-to-interference-plus-noise ratio or the first signal strength of the first communication as determined by the first unmanned aerial vehicle, the second signal parameters that indicate the second signal-to-interference-plus-noise ratio or the second signal strength of the first communication as determined by the second unmanned aerial vehicle, the third signal parameters that indicate the third signal-to-interference-plus-noise ratio or the third signal strength of the second communication as determined by the first unmanned aerial vehicle, and the fourth signal parameters that indicate the fourth signal-to-interference-plus-noise ratio or the fourth signal strength of the second communication as determined by the second unmanned aerial vehicle, determining, by the first unmanned aerial vehicle, that both the first unmanned aerial vehicle and the second unmanned aerial vehicle transmit third reply communication to the base station.

15. One or more non-transitory computer-readable media of a first unmanned aerial vehicle storing computer-executable instructions that upon execution cause one or more processors to perform acts comprising:
receiving, by a first unmanned aerial vehicle that includes a first transceiver, a first communication from a base station;
receiving, by the first unmanned aerial vehicle and from a second unmanned aerial vehicle that includes a second transceiver, data indicating that the second unmanned aerial vehicle received the first communication from the base station;
in response to receiving the data indicating that the second unmanned aerial vehicle received the first communication from the base station, determining, by the first unmanned aerial vehicle, first signal parameters of the first communication, wherein the first signal parameters indicate a first signal-to-interference-plus-noise ratio of the first communication or a first signal strength of the first communication;
receiving, by the first unmanned aerial vehicle and from the second unmanned aerial vehicle, second signal parameters of the first communication, wherein the second signal parameters indicate a second signal-to-interference-plus-noise ratio of the first communication as determined by the second unmanned aerial vehicle or a second signal strength of the first communication as determined by the second unmanned aerial vehicle;
based on the first signal parameters that indicate the first signal-to-interference-plus-noise ratio or the first signal strength of the first communication as determined by the first unmanned aerial vehicle and the second signal parameters that indicate the second signal-to-interference-plus-noise ratio or the second signal strength of the first communication as determined by the second unmanned aerial vehicle, outputting, by the first unmanned aerial vehicle and to the base station, a first reply communication to the first communication;
after receiving the first communication:
receiving, by the first unmanned aerial vehicle, a second communication from the base station; and
receiving, by the first unmanned aerial vehicle and from the second unmanned aerial vehicle, data indicating that the second unmanned aerial vehicle received the second communication from the base station;
in response to receiving the data indicating that the second unmanned aerial vehicle received the second communication from the base station, determining, by the first unmanned aerial vehicle, third signal parameters of the second communication, wherein the third signal parameters indicate a third signal-to-interference-plus-noise ratio of the second communication or a third signal strength of the second communication;

receiving, by the first unmanned aerial vehicle and from the second unmanned aerial vehicle, fourth signal parameters of the second communication, wherein the fourth signal parameters indicate a fourth signal-to-interference-plus-noise ratio of the second communication as determined by the second unmanned aerial vehicle or a fourth signal strength of the second communication as determined by the second unmanned aerial vehicle;

accessing, by the first unmanned aerial vehicle, a rule that specifies for the first unmanned aerial vehicle to determine whether the first unmanned aerial vehicle or the second unmanned aerial vehicle is to transmit, to the base station, a second reply communication to the second communication by analyzing (i) previous signal parameters of a previous communication received by the first unmanned aerial vehicle and the second unmanned aerial vehicle during a particular time period before receiving the second communication, (ii) the third signal parameters that indicate the third signal-to-interference-plus-noise ratio or the third signal strength of the second communication as determined by the first unmanned aerial vehicle, and (iii) the fourth signal parameters that indicate the fourth signal-to-interference-plus-noise ratio or the fourth signal strength of the second communication as determined by the second unmanned aerial vehicle, wherein the previous signal parameters include (i) previous first signal parameters that indicate a previous first signal-to-interference-plus-noise ratio or a previous first signal strength of the previous communication as determined by the first unmanned aerial vehicle and (ii) previous second signal parameters that indicate a previous second signal-to-interference-plus-noise ratio or a previous second signal strength of the previous communication as determined by the second unmanned aerial vehicle;

determining, by the first unmanned aerial vehicle, that the first unmanned aerial vehicle and the second unmanned aerial vehicle received the first communication during the particular time period before the first unmanned aerial vehicle and the second unmanned aerial vehicle received the second communication;

based on (i) accessing the rule that specifies for the first unmanned aerial vehicle to determine whether the first unmanned aerial vehicle or the second unmanned aerial vehicle is to transmit, to the base station, the second reply communication to the second communication by analyzing (a) previous signal parameters of the previous communication received by the first unmanned aerial vehicle and the second unmanned aerial vehicle during a particular time period before receiving the second communication, (b) the third signal parameters that indicate the third signal-to-interference-plus-noise ratio or the third signal strength of the second communication as determined by the first unmanned aerial vehicle, and (c) the fourth signal parameters that indicate the fourth signal-to-interference-plus-noise ratio or the fourth signal strength of the second communication as determined by the second unmanned aerial vehicle and (ii) determining that the first unmanned aerial vehicle and the second unmanned aerial vehicle received the first communication during the particular time period before the first unmanned aerial vehicle and the second unmanned aerial vehicle received the second communication, analyzing, by the first unmanned aerial vehicle, the first signal parameters that indicate the first signal-to-interference-plus-noise ratio or the first signal strength of the first communication as determined by the first unmanned aerial vehicle, the second signal parameters that indicate the second signal-to-interference-plus-noise ratio or the second signal strength of the first communication as determined by the second unmanned aerial vehicle, the third signal parameters that indicate the third signal-to-interference-plus-noise ratio or the third signal strength of the second communication as determined by the first unmanned aerial vehicle, and the fourth signal parameters that indicate the fourth signal-to-interference-plus-noise ratio or the fourth signal strength of the second communication as determined by the second unmanned aerial vehicle;

based on analyzing the first signal parameters that indicate the first signal-to-interference-plus-noise ratio or the first signal strength of the first communication as determined by the first unmanned aerial vehicle, the second signal parameters that indicate the second signal-to-interference-plus-noise ratio or the second signal strength of the first communication as determined by the second unmanned aerial vehicle, the third signal parameters that indicate the third signal-to-interference-plus-noise ratio or the third signal strength of the second communication as determined by the first unmanned aerial vehicle, and the fourth signal parameters that indicate the fourth signal-to-interference-plus-noise ratio or the fourth signal strength of the second communication as determined by the second unmanned aerial vehicle, selecting, by the first unmanned aerial vehicle, the second unmanned aerial vehicle to transmit, to the base station, the second reply communication to the second communication;

based on selecting the second unmanned aerial vehicle to transmit, to the base station, the second reply communication to the second communication, generating, by the first unmanned aerial vehicle, flight instructions that include flight parameters for the second unmanned aerial vehicle;

determining, by the first unmanned aerial vehicle, characteristics of the first unmanned aerial vehicle;

based on the characteristics of the first unmanned aerial vehicle, determining, by the first unmanned aerial vehicle, for the second unmanned aerial vehicle to select whether the first unmanned aerial vehicle or the second unmanned aerial vehicle are to transmit a subsequent reply communication to the base station in response to receiving a subsequent communication from the base station; and providing, for output by the first unmanned aerial vehicle and to the second unmanned aerial vehicle, an instruction to (i) transmit, to the base station, the second reply communication to the second communication and the flight instructions that include the flight parameters for the second unmanned aerial vehicle and (ii) select whether the first unmanned aerial vehicle or the second unmanned aerial vehicle are to transmit the subsequent reply communication to the base station in response to receiving the subsequent communication from the base station.

16. The method of claim 1, comprising:
before receiving the first communication:

receiving, by the first unmanned aerial vehicle, a third communication from the base station; and receiving, by the first unmanned aerial vehicle and from the second unmanned aerial vehicle, data indicating that the second unmanned aerial vehicle received the third communication from the base station;

in response to receiving the data indicating that the second unmanned aerial vehicle received the third communication from the base station, determining, by the first unmanned aerial vehicle, fifth signal parameters of the third communication, wherein the fifth signal parameters indicate a fifth signal-to-interference-plus-noise ratio of the third communication or a fifth signal strength of the third communication;

receiving, by the first unmanned aerial vehicle and from the second unmanned aerial vehicle, sixth signal parameters of the third communication, wherein the sixth signal parameters indicate a sixth signal-to-interference-plus-noise ratio of the third communication as determined by the second unmanned aerial vehicle or a sixth signal strength of the third communication as determined by the second unmanned aerial vehicle; and determining, by the first unmanned aerial vehicle, that the first unmanned aerial vehicle and the second unmanned aerial vehicle received the third communication outside the particular time period before the first unmanned aerial vehicle and the second unmanned aerial vehicle received the second communication, wherein analyzing the first signal parameters that indicate the first signal-to-interference-plus-noise ratio or the first signal strength of the first communication as determined by the first unmanned aerial vehicle, the second signal parameters that indicate the second signal-to-interference-plus-noise ratio or the second signal strength of the first communication as determined by the second unmanned aerial vehicle, the third signal parameters that indicate the third signal-to-interference-plus-noise ratio or the third signal strength of the second communication as determined by the first unmanned aerial vehicle, and the fourth signal parameters that indicate the fourth signal-to-interference-plus-noise ratio or the fourth signal strength of the second communication as determined by the second unmanned aerial vehicle comprises bypassing analyzing the fifth signal parameters that indicate the fifth signal-to-interference-plus-noise ratio or the fifth signal strength of the third communication as determined by the first unmanned aerial vehicle and the sixth signal parameters that indicate the sixth signal-to-interference-plus-noise ratio or the sixth signal strength of the third communication as determined by the second unmanned aerial vehicle based on determining that the first unmanned aerial vehicle and the second unmanned aerial vehicle received the third communication outside the particular time period before the first unmanned aerial vehicle and the second unmanned aerial vehicle received the second communication.

\* \* \* \* \*